2,989,556
METHOD OF PREPARING COMPLEXES OF PLUTONIUM WITH DIKETONES
Jonathan S. Dixon, Joseph J. Katz, and Edwin F. Orlemann, Chicago, Ill., assignors to the United States of America as represented by the United States Atomic Energy Commission
No Drawing. Filed Nov. 30, 1944, Ser. No. 565,999
6 Claims. (Cl. 260—429.1)

This invention relates to new and useful plutonium complexes and to the recovery of plutonium by formation of such complexes. Specifically, the invention is concerned with condensation complexes of plutonium with diketones which contain ketone groups close together in a carbon chain. Of particular interest are the complexes obtainable from $\beta$ diketones wherein the carbonyl groups are linked by a single carbon atom. Graphically, complexes of this type formed from tetravalent plutonium may be represented by the following general structure:

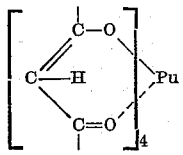

wherein the free valence bonds attached to the two carbon atoms are linked to a radical such as an alkyl, aralkyl or halogenated alkyl group. In such compounds, the plutonium apparently is linked by a covalent bond to the enol form of the diketone and also by a coordinate bond to the other ketone group.

The designation "plutonium" or "element 94" as used throughout the present description refers to the transuranic element having an atomic number of 94. The expression "$94^{239}$" means the isotope of element 94 having an atomic weight or mass of 239. Similarly, the term "element 93" or "Np" refer to the new element known as neptunium having an atomic number of 93. These elements may be prepared from natural uranium that has been bombarded by neutrons. The element uranium comprises two isotopes, namely, $U^{235}$ and $U^{238}$, the latter being present in excess of 99 percent of the whole. When $U^{238}$ is subjected to the bombardment of slow or thermal neutrons, it absorbs neutrons, and a further isotope, $U^{239}$, is produced having a half-life of 23 minutes and by beta decay forms to $Np^{239}$ which decays by beta radiation with a half-life of 2.3 days to yield plutonium.

Plutonium produced as a result of subjecting uranium to irradiation with slow neutrons is removed therefrom by dissolving the irradiated metal in a suitable acid such as nitric acid and by then separating it from uranium and the various fission products by formation of the complexes herein contemplated or by means of any of several other novel decontamination procedures. A method suitable for this purpose is that described and claimed in copending application U.S. Serial No. 478,570, filed March 9, 1943, by Stanley G. Thompson et al., now U.S. Patent No. 2,799,553, issued July 16, 1957. In accordance with the procedure there described, neutron irradiated uranium is dissolved in nitric acid, or preferably a mixture of nitric and sulfuric acids, and if necessary the plutonium selectively reduced to the tetravalent state with sulphur dioxide or other reducing agent, after which a source of bismuth ion, usually in the form of bismuth nitrate, is added. Thereafter, phosphoric acid, or some other suitable source of phosphate ion, is introduced into the solution whereupon a precipitate of bismuth phosphate is produced carrying with it plutonium and a relatively small proportion of the various fission products. The uranium and the bulk of the fission products are quite soluble under the conditions employed and remain in solution. The precipitate thus obtained is removed by filtration or other convenient means. The bismuth phosphate precipitate, which contains plutonium, apparently as the phosphate, and some fission products, is dissolved in nitric acid to form soluble plutonium nitrate which can then be converted to a relatively insoluble compound such as the peroxide or iodate thereby effecting its separation from dissolved impurities including fission products. Precipitation and dissolution may be repeated as often as required to secure a comparatively pure product.

In accordance with a preferred embodiment of our invention, complexes of the above described class may be prepared by reacting an acid solution of plutonium in the trivalent, tetravalent or hexavalent state with a diketone of the aforesaid type. The diketone is preferably added to the plutonium in the form of an alkaline solution. After all the diketone has been thus introduced, additional base is added until the reaction mixture becomes alkaline to litmus. During this change in pH of the solution, the desired chelate compound will be observed to precipitate from the reaction mixture, usually in the form of a reddish or reddish-brown crystalline product. The precipitate obtained in this manner may then be separated by filtration, or other convenient means, washed with water and dried over a suitable drying agent.

While the plutonium may be utilized in substantially any form in which it is soluble in the reaction medium employed, we have found it preferable, when precipitating tetravalent plutonium, to use plutonium hydroxide [$Pu(OH)_4$]. The latter compound may be readily precipitated from an aqueous solution of plutonium nitrate [$Pu(NO_3)_4$], such as that obtained in accordance with the process of Stanley G. Thompson et al., supra, by adding thereto a suitable base such as ammonium hydroxide. The precipitated plutonium hydroxide can then be dissolved in a strong acid such as sulfuric acid to give an acid solution of tetravalent plutonium suitable for use in our process.

As previously indicated, any diketone in which the carbonyl groups are relatively close together may be used. Since the reaction product is probably a compound in which both oxygen atoms of the carbonyl groups are linked to plutonium to form a ring, the number of carbon atoms between the carbonyl groups should not be so excessive as to preclude formation of the ring which rarely will contain more than 8 members. The beta diketones in which the carbonyl groups are separated by a methylene radical are especially effective in the preparation of the complexes of our invention. As examples of such diketones there may be mentioned dibenzoylmethane, 2,2,5,5-tetramethyl - 3,5 - heptadione, 3,5-heptadione, 4,6-nonanedione, propionyl acetone, propionyl trifluoro acetone, butyl trifluoryl acetone, hexoyl acetone, ethoxy acetyl acetone or other similar diketone, acetylacetone, benzoylacetone, and the like.

While the complexes herein contemplated may be prepared using a solution of previously purified plutonium, their production is especially valuable when used in conjunction with a process of purifying plutonium. For example, as previously mentioned, it is quite common to precipitate plutonium by means of a carrier or adsorbent. Thus, a solution of irradiated uranyl nitrate may be treated to selectively reduce the plutonium to a lower valence state, generally the tri- or tetravalent state, by means of a suitable reducing agent. Lower-valent plutonium ($Pu^{+++}$ or $Pu^{++++}$) may be oxidized to the hexavalent state by a substance having an oxidation potential of about 1.1 volts. Reduction of the plutonium to the lower valance state may be effected by reducing agents which are listed above −1.1 volts in the Latimer and Hildebrand table of oxidation-reduction potentials.

To secure a selective reduction of plutonium without excessive reduction of uranium, reducting agents having a reducing potential which is sufficiently low as to be unable to reduce hexavalent uranium are used. Suitable agents to accomplish this result include ferrous ion, uranous ion or hydroxylamine hydrochloride.

The solution containing reduced plutonium is then treated for removal of plutonium by contacting the solution with an adsorbent, such as niobic oxide ($Nb_2O_5$), silica gel, bismuth phosphate or resinous condensation products of phenol sulphonic acid and formaldehyde or by precipitating a carrier, such as bismuth phosphate or lanthanum fluoride in the solution. In such a process the adsorbent or carrier removes plutonium in the reduced state together with some quantity of the fission products. The plutonium is then removed from the carrier or adsorbent by dissolving or extracting with an acid, particularly an inorganic acid, to form an acid solution such as nitric acid solution containing 5 to 10 per cent $HNO_3$. A suitable description of such a process appears in an application of Stanley G. Thompson and Glenn T. Seaborg, Serial No. 478,570, filed March 9, 1943, now U.S. Patent No. 2,799,553, issued July 16, 1957.

The resulting solution contains plutonium, fission products, some uranium and more or less of the ions of the adsorbent. The plutonium or a substantial portion thereof may be removed from the soluble fission products by formation of the water insoluble organic complex such as herein described. These complexes are precipitated from solution or extracted with a solvent such as chloroform, benzene, ethyl acetate, carbon tetrachloride, aniline, n-hexyl alcohol, xylene, ethyl ether or other water immiscible organic solvent. The water immiscible organic solvents used in the process of the present invention extract the plutonium organic complexes from aqueous solutions either by actual solution in the solvent or by preferential wetting by the solvent. In the case of preferential wetting, the plutonium complex may appear in the organic solvent as a suspension or precipitate.

The following examples are illustrative:

*Example 1*

0.5 milliliters of a nitric acid aqueous solution having a pH of 8 after adjustment by the addition of an alkali hydroxide and containing about 400 microns of plutonium in the tetravalent state was shaken with three portions of a mixture each containing —0.5–1 milliliter chloroform and 1–3 milligram of benzoylacetone. The chloroform extracts were combined, and the chloroform was vaporized and a solid crystalline plutonium complex was secured.

This process may be used generally for the recovery of plutonium in the hexavalent, trivalent or tetravalent state with various diketones including acetylacetone, dibenzoyl methane, propionyl trifluoroacetone, etc.

*Example 2*

Fifteen micrograms of plutonium as tetravalent plutonium hydroxide was dissolved in a minimum amount of 6N sulphuric acid, and diluted to approximately 20 microliters. Twenty-five microliters of acetyl acetone were dissolved in 50 microliters of water by the addition of an amount of 6N ammonium hydroxide just sufficient to produce the solution. This solution was added to the plutonium solution, and more 6N ammonium hydroxide was added until the solution became alkaline to litmus. During the neutralization, a reddish-brown crystalline precipitate was formed. This precipitate was centrifuged out of solution, washed twice with water and dried over $P_2O_5$. The product is the plutonium complex of acetyl acetone. This compound is reddish-brown in color, melts at 170–173° C., is substantially insoluble in water and soluble in organic solvents such as chloroform or toluene.

The compounds or complexes herein described are stable colored compositions probably of the chelate type. They are generally organic-solvent-soluble solids and certain substituted diketones such as the fluoroketones are readily volatile liquids. The compositions may be used as fissionable compounds in which the plutonium atom fissions to form radio-active fission products upon neutron bombardment. Many of these compositions may be used as dyes or pigments due to their high color.

The invention is not limited in its application to any particular plutonium isotope but is broadly applicable to the formation of complexes of all isotopes of this element.

Although the present invention has been described with reference to specific details of certain embodiments thereof, it is not intended that such details shall be regarded as limitations except insofar as included in the accompanying claims.

We claim:

1. A method of removing plutonium from an aqueous solution containing salts of plutonium and uranium fission products, which comprises contacting said aqueous solution with a β-diketone in the presence of sufficient alkali hydroxide to render said aqueous solution alkaline, and separating the plutonium-containing diketone from the aqueous solution.

2. A process of separating plutonium values from an aqueous solution, which comprises contacting an acidic aqueous solution of a tetravalent plutonium salt with a β-diketone in which the carbonyl groups are separated by a methylene radical, adding alkali hydroxide whereby a plutonium-containing precipitate forms, and separating said precipitate from the solution.

3. The process of claim 2 in which the β-diketone is acetylacetone.

4. A process for plutonium separation from an aqueous solution, which comprises adding alkali hydroxide to a nitric acid solution of a tetravalent plutonium salt to obtain a pH value of 8, adding to the solution a β-diketone solution in a water-immiscible organic solvent, said β-diketone having the two carbonyl groups separated by a methylene radical; separating an aqueous phase and an organic phase; and volatilizing said organic solvent from the organic phase, whereby a residue containing the plutonium is obtained.

5. The process of claim 4 in which the β-diketone is benzoylacetone.

6. The process of claim 4 wherein the organic solvent is chloroform.

References Cited in the file of this patent

UNITED STATES PATENTS

| | | |
|---|---|---|
| 2,206,634 | Fermi | Oct. 3, 1935 |
| 2,208,253 | Flenner et al. | July 16, 1940 |
| 2,211,119 | Hixson et al. | Aug. 13, 1940 |

OTHER REFERENCES

Kurovski: "Ber. Deut. Chem. Ges.," vol. 43, pp. 1078 and 1079 (1910).

Morgan et al.: "Jour. Chem. Soc." (London), 103, pp. 78 to 90 (1913).

Hevesy: "Ber. Deut. Chem. Ges.," 59, p. 1891 (1921). (Copies in Scientific Library.)

Beilstein: "Organische Chemie," 2nd sup. (1941), pages 834, 835, 836 and 837. (Copy in Division 6.)

Beilstein: "Organische Chemie" (4), vol. I, 2nd sup. (1941), pages 834, 835, 836, and 837.

Seaborg et al.: Journal of the American Chemical Society, vol. 70, pp. 1128–34 (1948). Report first submitted on Mar. 21, 1942, and this date relied on. (Copy in Scientific Library.)

Urbain: Bull. Soc. Chim. 15, 348 (1896). (Copy in Sci. Lib.)

Biltz, Ann. 331, 336 (1904). (Copy in Scientific Library.)

(Other references on following page)

OTHER REFERENCES

Young et al.: J. Am. Chem. Soc. 61, 876 (1939). (Copy in Div. 6.)

Dixon et al.: "Preparation and Composition of Plutonium (IV) Acetylacetonate," ANL-JJK-14B-30, MDDC 1205, declassified August 1947 (7 pages). Copy in the Scientific Library. Article duplicated in Seaborg et al., "The Transuranium Elements," published by McGraw-Hill Book Co., Inc., (N.Y., N.Y.) 1949, vol. IV-14B (part I) pages 855-59. (Article based on reports, the latest issued April 1, 1944 and this date is relied on.)

Seaborg et al.: (I) The Transuranium Elements, published by McGraw-Hill Book Co., Inc., New York City (1949), vol. IV-14B (part I), pp. 25-38. (Copy in Div. 46. Report first submitted on March 21, 1942 and this date relied on.)